(12) United States Patent
Neveu et al.

(10) Patent No.: US 9,108,853 B2
(45) Date of Patent: Aug. 18, 2015

(54) PROCESS FOR PREPARING PRECIPITATED SILICA COMPRISING A MEMBRANE CONCENTRATION STEP

(71) Applicant: RHODIA OPERATIONS, Paris (FR)

(72) Inventors: Sylvaine Neveu, Paris (FR); Anne-Laure Pinault, Antony (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/386,012

(22) PCT Filed: Mar. 21, 2013

(86) PCT No.: PCT/EP2013/055978
§ 371 (c)(1),
(2) Date: Sep. 18, 2014

(87) PCT Pub. No.: WO2013/139934
PCT Pub. Date: Sep. 26, 2013

(65) Prior Publication Data
US 2015/0132209 A1    May 14, 2015

(30) Foreign Application Priority Data
Mar. 22, 2012  (FR) ..................................... 12 52587

(51) Int. Cl.
*C01B 33/193*   (2006.01)
*C01B 33/12*    (2006.01)

(52) U.S. Cl.
CPC ............. *C01B 33/128* (2013.01); *C01B 33/193* (2013.01)

(58) Field of Classification Search
CPC .................................................... C01B 33/193
USPC .................................................. 423/335, 339
See application file for complete search history.

(56) References Cited

U.S. PATENT DOCUMENTS

| 5,403,570 | A  | 4/1995  | Chevallier et al. |
| 5,871,867 | A  | 2/1999  | Rausch et al. |
| 5,882,617 | A  | 3/1999  | Chevallier et al. |
| 6,013,234 | A  | 1/2000  | Ray et al. |
| 6,335,396 | B1 | 1/2002  | Chevallier et al. |
| 6,468,493 | B1 | 10/2002 | Chevallier et al. |
| 6,761,867 | B1 | 7/2004  | Prat et al. |
| 2004/0062701 | A1 | 4/2004 | Valero et al. |
| 2005/0032965 | A1 | 2/2005 | Valero |
| 2011/0178227 | A1 | 7/2011 | Allain et al. |
| 2013/0171051 | A1 | 7/2013 | Clouin et al. |

FOREIGN PATENT DOCUMENTS

| EP | 0520862 A1 | 12/1992 |
| EP | 0754650 A1 | 1/1997 |
| WO | WO 95/09127 A1 | 4/1995 |
| WO | WO 95/09128 A1 | 4/1995 |
| WO | WO 96/01787 A1 | 1/1996 |
| WO | WO 98/54090 A1 | 12/1998 |
| WO | WO 02/53497 A1 | 7/2002 |
| WO | WO 03/016215 A1 | 2/2003 |
| WO | WO 2009/112458 A1 | 9/2009 |
| WO | WO 2012/010712 A1 | 1/2012 |
| WO | WO 2013/139930 A1 | 9/2013 |
| WO | WO 2013/139932 A1 | 9/2013 |
| WO | WO 2013/139933 A1 | 9/2013 |

OTHER PUBLICATIONS

Johnson, G. et al.—"V-SEP—Vibrating membrane system proves membranes aren't just for water anymore", Industrial Strength Membrane Filtration; www.vsep.com; Mar. 2009; XP002690037—8 pages.
U.S. Appl. No. 14/386,015, Neveu et al.
U.S. Appl. No. 14/386,093, Neveu et al.
U.S. Appl. No. 14/386,069, Fournier et al.

*Primary Examiner* — Kaj K Olsen
*Assistant Examiner* — James Fiorito

(57) ABSTRACT

A process for preparing precipitated silica, in which a silicate is reacted with an acidifying agent in order to obtain a suspension of precipitated silica (S1), followed by: a separation step in order to obtain a cake, a cake-disintegration step in order to obtain a suspension of precipitated silica (S2), and a suspension drying step. According to the invention, a membrane concentration step is performed between the disintegration step and the drying step.

15 Claims, No Drawings

PROCESS FOR PREPARING PRECIPITATED SILICA COMPRISING A MEMBRANE CONCENTRATION STEP

The present application is a U.S. national stage entry under 35 U.S.C. §371 of International Application No. PCT/EP2013/055978 filed Mar. 21, 2013, which claims priority to French Application No. 12.52587 filed on Mar. 22, 2012, the whole content of this application being herein incorporated by reference for all purposes.

The present invention relates to an improved process for the preparation of precipitated silica.

It is known to employ precipitated silicas as catalyst support, as absorbent for active materials (in particular supports for liquids, for example used in food, such as vitamins (especially vitamin E) or choline chloride), as viscosifying, texturizing or anticaking agent, as battery separator component, or as additive for toothpaste, for paper.

It is also possible to employ precipitated silicas as reinforcing filler in silicone matrices (for example for covering electrical cables) or in compositions based on natural or synthetic polymer(s), in particular on elastomer(s), especially diene elastomer(s), for example for footwear soles, floor coverings, gas barriers, flame-retardant materials and also engineering components, such as cableway rollers, seals for domestic electrical appliances, seals for liquid or gas pipes, braking system seals, sheathings, cables and transmission belts.

Precipitated silica has in particular been used for a long time as white reinforcing filler in elastomers and especially in tires.

Precipitated silica is generally prepared by a precipitation reaction between a silicate, in particular an alkali metal silicate, and an acidifying agent, followed by a step of separation by filtration, in order to obtain a filtration cake, and usually by a step of washing said cake, then by an optional step of disintegrating the filtration cake and by a step of drying said cake, for example by atomization.

In the context of the processes of the state of the art, the cake, generally after a disintegrating operation, subjected to the atomization step comprises a large amount of water. The implementation of the atomization step thus makes it possible in particular to discharge this high amount of water, which requires a great deal of time and consumes a large amount of energy.

Thus, one of the aims of the present invention consists in providing a process for the preparation of precipitated silica which makes it possible to limit energy costs, in particular in terms of drying.

One of the aims of the invention is in particular to provide an alternative to the known processes for the preparation of precipitated silica which is economical and simple to carry out.

One of the aims of the present invention preferably consists in providing a process which makes it possible to reduce the energy consumption in drying, in particular with respect to the processes of the state of the art, generally by at least approximately 10%, in particular by at least approximately 15%, for example by at least approximately 20%.

One of the aims of the present invention preferably consists in providing a process which makes it possible to increase the productive output of the process for the preparation of precipitated silica, especially at the drying step, in particular with respect to the processes of the state of the art, generally by at least approximately 15%, in particular by at least approximately 20%, for example by at least approximately 25%.

The present invention thus relates to a process for the preparation of precipitated silica comprising the reaction of a silicate with an acidifying agent in order to obtain a suspension of precipitated silica (S1), followed by a separation step in order to obtain a cake, by a step of disintegrating said cake in order to obtain a suspension of precipitated silica (S2), and by a step of drying this suspension, and in which a membrane concentration step is carried out between said disintegrating step and said drying step.

In particular, the process according to the present invention thus comprises the following steps:
- at least one silicate is reacted (precipitation reaction) with at least one acidifying agent, so as to obtain a suspension of precipitated silica (S1),
- a solid/liquid separation step, more particularly a filtration step, is carried out in order to obtain a solid product, also denoted "filtration cake",
- said filtration cake is subjected to a disintegrating operation, in order to obtain a suspension of precipitated silica (S2),
- a membrane concentration step is subsequently carried out on said suspension (S2), and
- the product thus obtained is dried, preferably by atomization.

The specific step of the process of the invention, taken in combination with the other steps of said process, consists of a membrane concentration step which allows to mechanically remove a high amount of water from the suspension (S3) obtained after disintegrating.

Such an operation, combined with the other steps of the process, then allows to increase the solids content of the product before the drying step. The product which is subsequently subjected to drying comprises less water, which results in a saving in energy for the subsequent drying step.

The implementation of the process according to the invention then allows to increase the productivity, in particular of the drying step, by at least approximately 15%, preferably by at least approximately 20%, for example by at least approximately 25%, with respect to the processes of the state of the art, advantageously while not degrading the properties of the precipitated silica obtained, in particular its dispersibility, especially in elastomers.

The concentration step employed involves membrane techniques. It consists in particular in circulating the above-mentioned suspension (S2) through a membrane and in recovering the concentrate thus obtained.

These membrane techniques are well known to a person skilled in the art.

According to one embodiment of the process of the invention, the membrane concentration step is carried out by tangential filtration. This tangential filtration technique is also well-known to a person skilled in the art.

Thus, tangential filtration consists in passing a fluid, namely the above-mentioned suspension (S2), tangentially to the surface of the filter. It is the pressure of the fluid which allows the latter to pass through the filter. The particles, in this case, remain in the tangential circulation stream and the blocking of the filtration media thus takes place much less quickly.

According to one embodiment of the process of the invention, the membrane concentration step is carried out by standard or dynamic tangential filtration.

In the case of standard tangential filtration, the membrane used is stationary and it is thus the fluid, namely in this case the suspension (S2), which circulates. In the case of dynamic tangential filtration, the membrane is in motion. These two tangential filtration techniques are well known to a person skilled in the art.

According to a preferred embodiment of the process of the invention, the membrane concentration step is carried out by dynamic tangential filtration, in particular of vibratory (for example using the VSEP (Vibratory Shear Enhanced Processing) system) or rotary type.

According to one embodiment of the process of the invention, the membrane concentration step is carried out by rotary dynamic tangential filtration.

In the context of the process according to the invention, use is thus made, for example, of the technique of dynamic tangential filtration with rotating disks. In this process, rotating ceramic disks then generate turbulent movements and a difference in speed between the filtration media and the suspension. These turbulent movements prevent solid agglomerates from forming at the surface of the membranes which may impede the filtration. This technology consists in removing the water mechanically and not by evaporation, which makes it possible in the end to reduce the energy costs.

According to one embodiment of the process of the invention, the product obtained on conclusion of the membrane concentration step is a suspension (S3) of precipitated silica having a solids content of greater than 24% by weight, preferably of at least 26% by weight.

According to one embodiment of the process of the invention, the product obtained on conclusion of the membrane concentration step is a suspension (S3) of precipitated silica having a solids content of between 25% and 30% by weight.

According to one embodiment of the process of the invention, the membrane concentration step is carried out under hot conditions and in particular at a temperature of between 40 and 90° C.

The process according to the invention relates to a process for the synthesis of precipitated silica, that is to say that first a precipitation step is carried out in which at least one acidifying agent is reacted with at least one silicate, without limitation to a specific type of precipitated silica.

The process according to the invention can be carried out in particular for the preparation of precipitated silicas as obtained according to the processes described, for example, in the applications EP 0 520 862, EP 0 670 813, EP 0 670 814, EP 0 917 519, WO 95/09127, WO 95/09128, WO 98/54090, WO 03/016215, WO 2009/112458 or WO 2012/010712.

The precipitation reaction by reaction of a silicate with an acidifying agent can be carried out in the process according to the present invention according to any method of preparation, in particular by addition of an acidifying agent to a feedstock of silicate, or else by simultaneous addition, total or partial, of acidifying agent and of silicate to a feedstock of water, or of silicate or of acidifying agent.

The choice of the acidifying agent and of the silicate is made in a way well known per se. Use is generally made, as acidifying agent, of a strong inorganic acid, such as sulfuric acid, nitric acid or hydrochloric acid, or also of an organic acid, such as acetic acid, formic acid or carbonic acid.

There is obtained, on conclusion of the precipitation step, a suspension (or slurry) S1 of precipitated silica, to which it is optionally possible to add various additives, which is subsequently separated.

According to a specific embodiment of the invention, the above-mentioned separation step consists of a solid/liquid separation step. Preferably, it consists of a filtration step, on conclusion of which a filtration cake is obtained, if appropriate followed by a step of washing said cake.

The filtration can be carried out according to any suitable method, for example using a filter press, a belt filter or a rotary vacuum filter.

The cake obtained is subsequently subjected to a disintegrating step. The disintegrating operation is a fluidification or liquefaction operation, in which the filtration cake is rendered liquid, the precipitated silica being once again in suspension. In general, this operation makes it possible in particular to lower the viscosity of the suspension to be subsequently dried. This operation can thus be carried out by subjecting the filtration cake to a chemical action, for example by addition of an aluminum compound, such as sodium aluminate, and/or of acid, preferably coupled with a mechanical action (for example, by passing through a continuously stirred tank or through a mill of colloid type). The suspension (in particular aqueous suspension) S2 obtained after disintegrating generally exhibits a relatively low viscosity.

According to one embodiment, the process of the invention can comprise a lump-breaking step between the separation step and the disintegrating step.

This optional step consists in crumbling the cake resulting from the separation step and makes it possible to reduce the particle size of said cake. For example, this step can be carried out with a Gericke Nibbler, in which the cake is forced through a screen with a diameter of less than 20 mm, preferably with a size of between 2 and 14 mm. This lump-breaking step can also be carried out with Wyssmont devices, such as the "Rotocage Lumpbreaker", the "Double Rotocage Lumpbreaker" or the "Triskelion Lumpbreaker".

The suspension of precipitated silica S2 obtained in the disintegrating step is subjected to the membrane concentration step as described above.

The suspension of precipitated silica S3 resulting from the membrane concentration step is subsequently dried.

This drying can be carried out according to any means known per se.

According to a preferred embodiment of the process of the invention, the drying is carried out by atomization.

To this end, use may be made of any type of suitable atomizer, in particular a turbine atomizer, a nozzle atomizer, a liquid pressure atomizer, or a two-fluid atomizer.

Preferably, in the process according to the invention, the separation step is carried out by means of a vacuum filter (in particular a rotary vacuum filter) and the drying step is carried out using a nozzle atomizer.

When the drying operation is carried out by means of a nozzle atomizer, the precipitated silica capable of then being obtained advantageously exists in the form of substantially spherical beads (micropearls), preferably with a mean size of at least 80 μm.

On conclusion of this drying operation, it is optionally possible to carry out a milling step on the product recovered; the precipitated silica then obtained generally exists in the form of a powder, preferably with a mean size of between 5 and 70 μm.

When the drying operation is carried out by means of a turbine atomizer, the precipitated silica capable of then being obtained can exist in the form of a powder, for example with a mean size of between 5 and 70 μm.

The dried (for example by a turbine atomizer) or milled product as indicated above can optionally be subjected to an agglomeration step, which consists, for example, of a direct compression, a wet granulation (that is to say, with use of a binder, such as water, silica suspension, and the like), an extrusion or, preferably, a dry compacting. When the latter technique is employed, it may prove to be advisable, before carrying out the compacting, to deaerate (operation also referred to as predensification or degassing) the pulverulent products so as to remove the air included therein and to ensure more uniform compacting.

The precipitated silica capable of being obtained on conclusion of this agglomeration step is generally in the form of granules, in particular with a size of at least 1 mm, for example of between 1 and 10 mm, especially along the axis of their greatest dimension.

The following examples illustrate the invention without, however, limiting the scope thereof.

EXAMPLES

Example 1

The suspension of precipitated silica used (S2) is a slurry of silica Z1165MP, resulting from a filtration step followed by a step of disintegrating the cake obtained in the filtration step, exhibiting the following characteristics:
Temperature: 50° C.
pH: 6.0-6.5
Humidity: 77%

A portion (S'2) of the suspension S2 is dried directly by atomization.

The other portion of the suspension S2 is subjected to a membrane concentration step on a DCF 152/0.14 filtration unit (Kmpt), developing a filtering surface area of 0.14 m² and using $Al_2O_3$ membranes (Kerafol) with a pore diameter of 200 nm.

The transmembrane pressure is set at 0.8 bar and backwashes at 0.4 bar are carried out every 4 seconds.

The permeate flow rate is 25 l/h/m². The concentrated slurry S3 obtained has a solids content of 26%.

The slurry S3 having a solids content of 26% is subsequently atomized, as in the case of the portion S'2 of the suspension S2.

A saving in energy consumption of 15%, with respect to the direct drying of the slurry S'2, and an associated gain in productivity of 18% are thus observed.

The particle sizes of the slurries before and after membrane concentration are given in the following table.

| Suspension | % particles < 0.5 µm (*) in the suspension |
|---|---|
| S'2 | 65% |
| S3 | 65% |

(*) The percentage of particles having a diameter of less than 0.5 µm is measured by particle sizing by sedimentation carried out on the Sedigraph 5100 (Micromeretics) device from the percentage of particles of less than 0.5 µm. The suspension analyzed by this technique is diluted to 4.6% by weight in purified water and it is gently stirred. The suspension obtained is subsequently sieved using a 250 µm sieve and the analysis is carried out taking a measurement range between 0.3 and 85 µm.

These data make it possible to observe that the mechanical actions experienced by the silica slurry S2 (in order to obtain the slurry S3) do not modify its content of fine particles.

Example 2

The suspension of precipitated silica used (S2) is a slurry of silica Z1165MP, resulting from a filtration step followed by a step of disintegrating the cake obtained in the filtration step, exhibiting the following characteristics:
Temperature: 50° C.
pH: 6.0-6.5
Humidity: 77%

A portion (S'2) of the suspension S2 is dried directly by atomization.

The other portion of the suspension S2 is subjected to a membrane concentration step on an SSDF CRD-01 filtration unit (Novoflow). This unit comprises a stack of 3 disks with a diameter of 152 mm which are composed of Kerafol membranes made of $Al_2O_3$ with a pore diameter of 200 nm, i.e., a filtering surface area of 0.1 m².

A transmembrane pressure of 1 bar is applied. A slurry S3 having a solids content of 27.5% is obtained with a permeate flow rate of 18 l/h/m².

The slurry S3 having a solids content of 27.5% is subsequently atomized, as in the case of the portion S'2 of the suspension S2.

A saving in energy consumption of 22%, with respect to the direct drying of the slurry S'2, and an associated gain in productivity of 27% are thus observed.

The particle sizes of the slurries before and after membrane concentration are given in the following table.

| Suspension | % particles < 0.5 µm (*) in the suspension |
|---|---|
| S'2 | 59% |
| S3 | 62% |

(*) measurement carried out as in example 1

These data make it possible to observe that the mechanical actions experienced by the silica slurry S2 (in order to obtain the slurry S3) do not substantially modify its content of fine particles.

Example 3

The suspension of precipitated silica used (S2) is a slurry of silica Z1165MP, resulting from a filtration step followed by a step of disintegrating the cake obtained in the filtration step, exhibiting the following characteristics:
Temperature: 50° C.
pH: 6.0-6.5
Humidity: 84%

A portion (S'2) of the suspension S2 is dried directly by atomization.

The other portion of the suspension S2 is subjected to a membrane concentration step on a Carbosep tangential filtration unit equipped with a Carbosep M9 membrane having a cut-off threshold of 300 kD. The recirculation flow rate is set at 800 l/h and the mean transmembrane pressure is 2 bar.

The concentrated slurry S3 obtained has a solids content of 26%, with a mean permeate flow rate of 100 l/h/m².

The slurry S3 having a solids content of 26% is subsequently atomized, as in the case of the portion S'2 of the suspension S2.

A saving in energy consumption of 46%, with respect to the direct drying of the slurry S'2, and an associated gain in productivity of 84% are thus observed.

The process according to the invention comprising a membrane concentration step thus makes it possible to achieve savings in energy and to increase the productivity in the drying.

The invention claimed is:

1. A process for preparing precipitated silica, said process comprising a reaction of a silicate with an acidifying agent in order to obtain a suspension of precipitated silica (S1), followed by a separation step in order to obtain a cake, by a step of disintegrating said cake in order to obtain a suspension of precipitated silica (S2), and by a step of drying said suspension of precipitated silica, wherein, in said process, a membrane concentration step is carried out between said disintegrating step and said drying step.

2. The process as claimed in claim 1, wherein said membrane concentration step is carried out by tangential filtration.

3. The process as claimed in claim 1, wherein said membrane concentration step is carried out by dynamic tangential filtration.

4. The process as claimed in claim 1, wherein said membrane concentration step is carried out by rotary dynamic tangential filtration.

5. The process as claimed in claim 1, wherein the product obtained on conclusion of the membrane concentration step is a suspension of precipitated silica having a solids content of greater than 24% by weight.

6. The process as claimed in claim 1, wherein the product obtained on conclusion of the membrane concentration step is a suspension of precipitated silica having a solids content of between 25% and 30% by weight.

7. The process as claimed in the claim 1, wherein said membrane concentration step is carried out at a temperature of between 40 and 90° C.

8. The process as claimed in claim 1, further comprising a lump-breaking step which is carried out between the separation step and the disintegrating step.

9. The process as claimed in claim 1, wherein said separation step consists of a filtration step, optionally followed by a washing step.

10. The process as claimed in claim 9, wherein said filtration step is carried out using a vacuum filter or a filter press.

11. The process as claimed in claim 1, wherein said drying step is carried out by atomization.

12. The process as claimed in claim 1, wherein the product resulting from the drying step is subjected to a milling step.

13. The process as claimed in claim 1, wherein the product resulting from the drying step is subjected to an agglomeration step.

14. The process as claimed in claim 1, wherein the product obtained on conclusion of the membrane concentration step is a suspension of precipitated silica having a solids content of greater than 26% by weight.

15. The process as claimed in claim 12, wherein the product resulting from the milling step is subjected to an agglomeration step.

\* \* \* \* \*